M. W. LINK.
FRONT RADIUS ROD FOR AUTOMOBILES.
APPLICATION FILED OCT. 8, 1919.
1,335,514.  Patented Mar. 30, 1920.
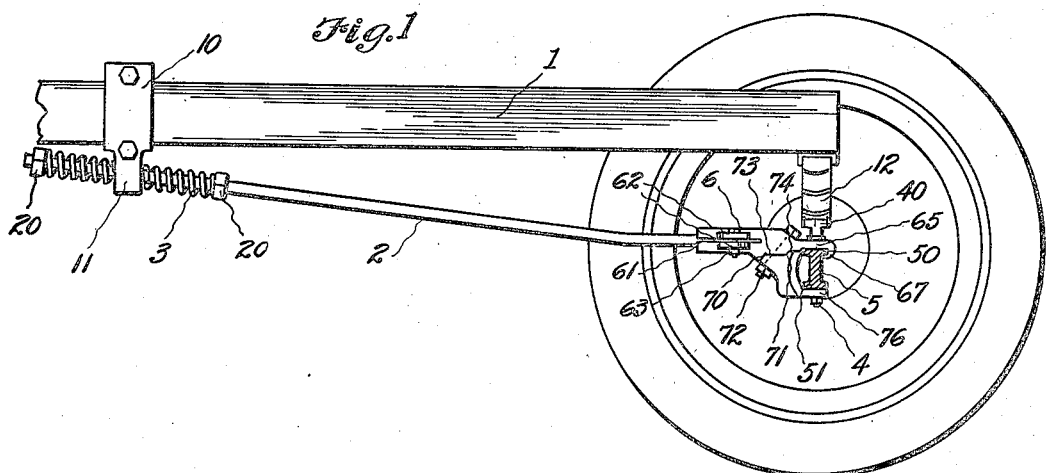
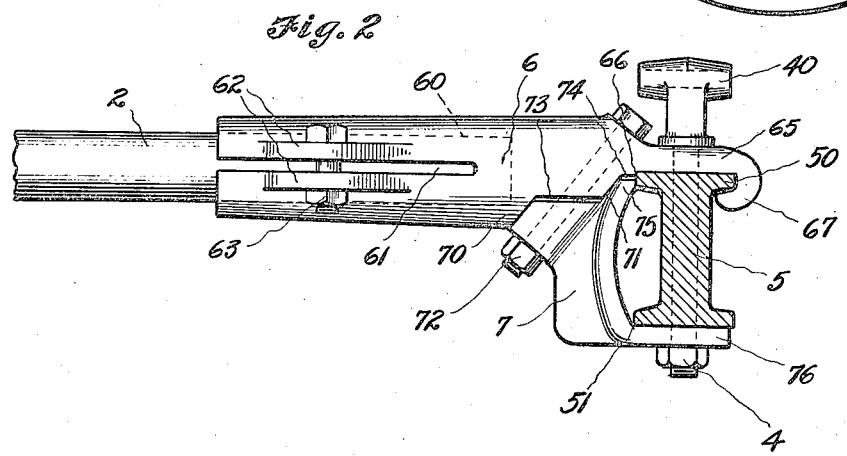
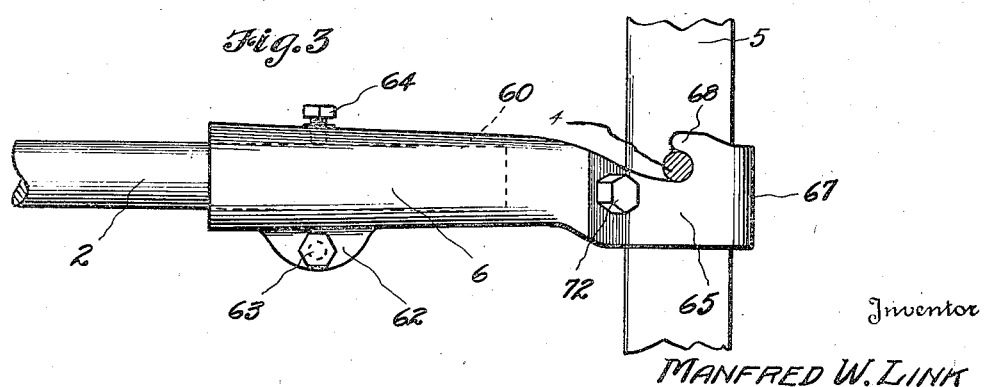
Inventor
MANFRED W. LINK
By Reynolds V. Cook
Attorney

UNITED STATES PATENT OFFICE.

MANFRED W. LINK, OF SEATTLE, WASHINGTON.

FRONT RADIUS-ROD FOR AUTOMOBILES.

1,335,514.  Specification of Letters Patent.  Patented Mar. 30, 1920.

Application filed October 8, 1919. Serial No. 329,259.

*To all whom it may concern:*

Be it known that I, MANFRED W. LINK, a citizen of the United States, and resident of the city of Seattle, King county, and State of Washington, have invented certain new and useful Improvements in Front Radius-Rods for Automobiles, of which the following is a specification.

My invention relates to radius rods for automobiles and particularly to radius rods intended for use in connection with the front axles of automobiles.

The object of my invention is to provide a radius rod and means for securing the same in place upon cars after their construction, whereby a stronger and better support may be made between the front axle and the chassis of automobiles. The novel feature of my invention and that upon which I desire patent protection, will be herein described in one embodiment thereof, and then particularly defined by the claims which terminate this specification.

In the accompanying drawings I have shown my device in the present preferred form of construction and the manner of applying it to one make of automobile.

Figure 1 is a side view of the front end of an automobile chassis and a front wheel, together with the axle, the latter being in section.

Fig. 2 is a detail showing a side view of the front end of my device, or that end which is secured to the axle.

Fig. 3 shows the same parts in top or plan view.

The prime object of my invention is to provide a device which may be applied to automobiles and which will better support the front axle of an automobile against the backward thrust caused by the wheels encountering obstructions. As herein illustrated the construction is that which has been designed for application to Ford cars. The principle of its application to other cars will however be evident. In the drawings 1 represents one of the side bars of the car chassis. To this, at a point rearwardly of the axle, is secured a bracket, or bar 10, which is provided, at its lower end, with an eye 11, through which passes one end of the thrust bar 2.

As herein shown this thrust bar is connected with the bracket arm 10 in such manner as to provide for a certain amount of yielding. While I deem this to be desirable, I do not consider it strictly essential in the present invention. This result has been secured by placing helically coiled springs 3 about the rod or bar 2, at each side of the arm 11 and the use of nuts, as 20, which are adjustable upon the thrust rod 2, so as to vary the initial tension placed upon these springs and therefore, the amount of thrust which would be required before the springs will yield.

The other end of the thrust bar is secured to the axle in conjunction with a bolt, as 4, which is used, in the present construction of the cars, as a support for one end of the forward spring 12. This bolt, as illustrated, is the same bolt as is now used in the make of cars mentioned. This bolt passes through the axle 5 and has a T-shaped head 40, at its upper end, said head being laterally offset from the shank of the bolt which passes through the axle.

A casting 6 has a hollow, or socket, 60 at one end, into which the main body of the thrust bar 2 may enter. This socket is slit at one side, as shown by the slot 61, and is provided with ears 62 through which passes a clamping bolt 63, by which means the two sides may be drawn together and thus clamp the thrust rod in place. In conjunction with this, a set screw 64 may also be used.

The socket member 6 has a flat forward end 65, which rests upon the upper surface of the axle 5. This I prefer to provide with a slight shoulder at 66, adapted to engage with the rear edge of the upper surface of the axle. The outer end of the flat portion 65, is curved, so as to form a hook 67, adapted to engage under the forward flange 50 at the top of the axle. The shank of the bolt 4 passes through the part 65 and clamps it in place against the upper surface of the axle.

Along with the casting 6, I employ a second casting 7, the same serving as a bracket, or removable member, which engages with the lower side of the axle, thus forming a brace to hold the axle firmly against any twisting, or rocking movement. The two parts 6 and 7 are provided with inclined surfaces at 70 and 71, which extend in a direction parallel with the direction of a clamping or securing bolt 72, which bolt passes through both parts 6 and 7. The two parts 6 and 7 have horizontal surfaces, 73 and 74, which are designed to be slightly separated, so that, when the bolt 72 is tightened, the two parts 6 and 7 may be drawn closely together in the direction of the length of the bolt.

The bracket arm 7 has an end 75, which has its tip bearing against the edge of the rear flange at the top of the axle 5. The upper flange of the axle is thus tightly clamped between this finger 75 and the hook 67. The bracket arm 7 has a flange 76 which passes under the rear side of the axle and the shank of the bolt 4 passes through this; it is thereby firmly secured to the bottom surface of the axle. The rearward edge of the flange 51 of the axle is designed to enter and have bearing in the angle between the flange 70 and the body of the bracket 7 thereby forming a thrust support between these two parts.

The flange portion 65 of the socket member 6, which extends over the upper surface of the axle, is provided with a recess formed by the hook arm 68, and in use the hook 68 is placed upon one side of the shank of the bolt 4, after the manner in Fig. 3. In this way the device is securely held against movement lengthwise of the axle.

In applying this device to a car the hook 67 of the casting 6, is hooked over the flange 50 of the axle and the casting then swung downward, bringing its shoulder 66 in position to form a thrust engagement with the rear edge of the axle. The bracket member 7 is then put in place and these parts secured to the axle by the bolt 4. The clamping bolt 72 is then put in position and drawn tight; this forces the lip 75 of the bracket arm strongly against the rear edge of the upper flange of the axle. The rear end of the thrust rod 2 is put in place within the arm 10 and this arm firmly fixed upon the chassis bar 1.

By reason of the construction of the front end of this thrust bar, it securely holds the axle against any tendency to turn or twist about a horizontal axis, which might be caused by the front wheel striking an obstruction. Contact of the wheels with an obstruction of this sort produces a rocking or twisting effort in the axle tending to swing its under edge rearwardly. This tendency would be transmitted through the surfaces 70 between the bracket member and socket member 7 and 6 respectively, and through the rod 2, to the arm 10 and the chassis bar 1. By these parts the axle is thoroughly supported against any shocks due to rough surfaces, or meeting obstructions. The springs 3 would provide a yielding support which may be of any stiffness desired, by properly proportioning the tension of the spring 3.

What I claim as my invention is:

1. A front radius rod for automobiles provided at one end with a head having a flange adapted to hook over the front edge of the axle, a separable bracket block adapted to engage with one side of the axle, a bolt binding said parts to the axle, and a bolt binding the bracket block to the head.

2. A front radius rod for automobiles comprising a head having a rod receiving socket, a rod entering said socket, means for securing the other end of the rod to the chassis, the head having a flange fitting the top of the axle and the front edge thereof, a bracket block seating upon the head and extending under the axle, said head and bracket block having angularly positioned thrust surfaces and a clamping bolt adapted to produce sliding movement between said thrust surfaces to clamp the axle.

3. A front radius rod for automobiles having a head adapted to engage the upper surface of the axle and having a flange hooking over the front edge of the axle and an inclined thrust surface a short distance back of the axle, a bracket block extending under the axle and having an arm interposed between said thrust surface and the axle, and a clamping bolt for drawing the head and block together.

4. A front radius rod for automobiles having a head adapted to engage the top and front surfaces of the axle and a recess to receive the spring supporting bracket, the head having thrust shoulders on its under side back of the axle, the faces of said shoulders being inclined backward, a bracket block having complemental thrust surfaces and having one arm having a thrust bearing against the rear edge of the top part of the axle and an arm adapted to be secured to the bottom of the axle, and a clamping bolt connecting the head and bracket block and acting substantially in line with the said thrust surfaces.

5. A front radius rod for automobiles comprising a rod, a head having a slitted socket for the reception of the said rod, a clamping bolt for binding the rod in said socket, a bracket block adapted in conjunction with the head to grip the axle between them, and a clamping bolt to hold the head and block in clamping position.

Signed at Seattle, Washington, U. S. A., this 30th day of September, 1919.

MANFRED W. LINK.